United States Patent

Doelling et al.

[11] Patent Number: 5,979,262
[45] Date of Patent: Nov. 9, 1999

[54] GEARSHIFT DEVICE FOR A MOTOR VEHICLE MANUAL TRANSMISSION

[75] Inventors: Matthias Doelling, Bergisch Gladbach; Jean-Pierre Chazotte, Cologne; Hartmut Deidewig, Roesrath, all of Germany

[73] Assignee: Ford Global Technologies, Inc., Dearborn, Mich.

[21] Appl. No.: 09/153,649

[22] Filed: Sep. 15, 1998

[30] Foreign Application Priority Data

Sep. 20, 1997 [DE] Germany ............... 197 41 633

[51] Int. Cl.⁶ .................................................. F16H 61/18
[52] U.S. Cl. ................................ 74/473.22; 74/473.21
[58] Field of Search ........................ 74/473.21, 473.22, 74/473.25, 483.27, 473.28, 473.33

[56] References Cited

U.S. PATENT DOCUMENTS

| | | | |
|---|---|---|---|
| 4,510,818 | 4/1985 | Inui | 74/473.25 |
| 4,539,859 | 9/1985 | Arai et al. | 74/473.27 |
| 4,569,247 | 2/1986 | Inui et al. | 74/473.27 |
| 4,638,678 | 1/1987 | Gorman et al. | 74/473.22 |
| 4,660,433 | 4/1987 | Horiuchi et al. | 74/473.22 |
| 4,738,153 | 4/1988 | Sabel | 74/473.28 |

FOREIGN PATENT DOCUMENTS 41-10-555-C2  10/1992  Germany.

*Primary Examiner*—Tamara L. Graysay
*Assistant Examiner*—Son V. Nguyen
*Attorney, Agent, or Firm*—Frank G. McKenzie

[57] ABSTRACT

In a gearshift device for a motor vehicle manual transmission, comprising a shift finger (6), located on an axially slidable and radially twistable shift shaft (1), which can be brought into engagement with grooves in shift arms of shift forks and which carries a cylindrical guide member (4), movable together with the shift finger, which co-operates with at least one spring-loaded ball catch (8), the cylindrical guide member (4) is formed of sheet material and exhibits a shift gate (9), in the form of a stamped slit, for a stationary shift pin (7), to guide the shifting movement and is provided at the outer circumference with troughs (10) extending parallel to the cylinder axis to latch with a stationary, spring loaded ball catch (8), and a part-cylindrical spring segment (11) is disposed within the cylindrical guide member (4) and is provided with a ramp-like depression (15) which co-operates with the stationary, rotatably mounted shift pin (7) to form a reverse gear shift block.

4 Claims, 4 Drawing Sheets

GEARSHIFT DEVICE FOR A MOTOR VEHICLE MANUAL TRANSMISSION

BACKGROUND OF THE INVENTION

1. Field of the Invention

The invention relates to a gearshift device for a motor vehicle manual transmission.

2. Description of the Prior Art

A gearshift device for a motor vehicle manual transmission is known from Patent Specification DE 41 10 555 C2.

In the known gearshift device the reverse gear is arranged laterally outside the H-shift layout and accordingly no blocking means to reliably prevent direct shifting from a forward gear into the reverse gear is provided. All that is provided is a ramp, which increases resistance on engaging reverse gear.

SUMMARY OF THE INVENTION

It is an object of the invention to provide an improved gearshift device wherein the reverse gear lies in the fifth gear shift lane and blocking means is provided which prevents the reverse gear from being accidentally engaged on shifting down from fifth to fourth gear.

According to the invention this object is achieved if, in a gearshift device, the cylindrical guide member is in the form of a sheet metal component in which a shift gate in the form of a stamped slit for a stationary, rotatably mounted shift pin is provided to guide the shifting movement; troughs extending parallel to the cylinder axis to latch with a stationary, spring loaded ball catch are provided at the outer circumference to guide the preselection movement; and a part-cylindrical spring segment is disposed within the cylindrical guide member and fixed at one end by rivets and is provided with a ramp-like depression which, in co-operation with the stationary shift pin, forms a reverse gear shift block.

This results in a shift device that is extremely simple and economical to manufacture and makes a substantial contribution to the reduction of the weight of a gearshift device.

BRIEF DESCRIPTION OF THE DRAWINGS

The invention will now be described in more detail, by way of example, with reference to an embodiment shown in the accompanying drawings, in which.

DESCRIPTION OF A PREFERRED EMBODIMENT OF THE INVENTION

Figure 1:
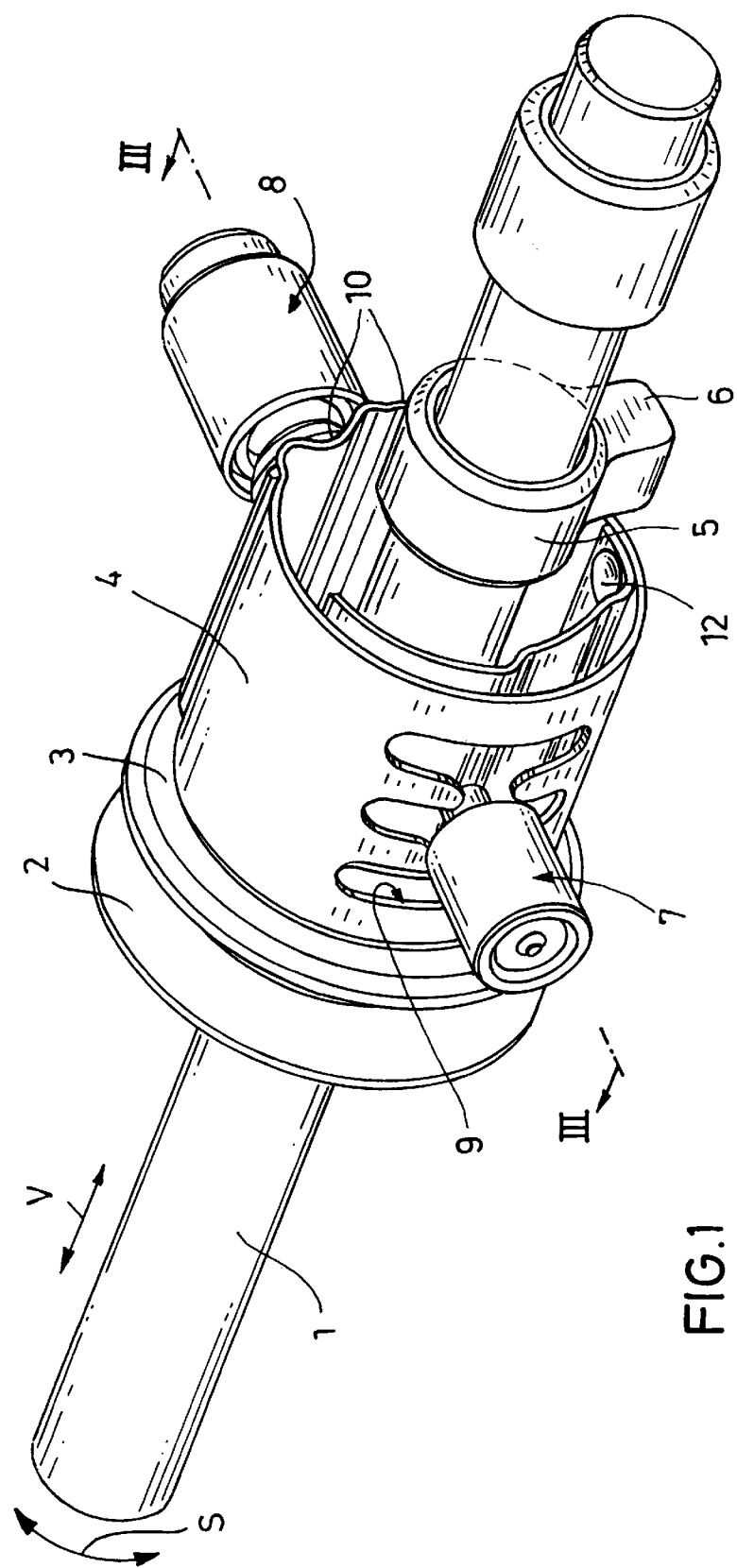
FIG. 1 shows a perspective view of a gearshift device for a motor vehicle manual transmission, in accordance with the invention.
Figure 2:
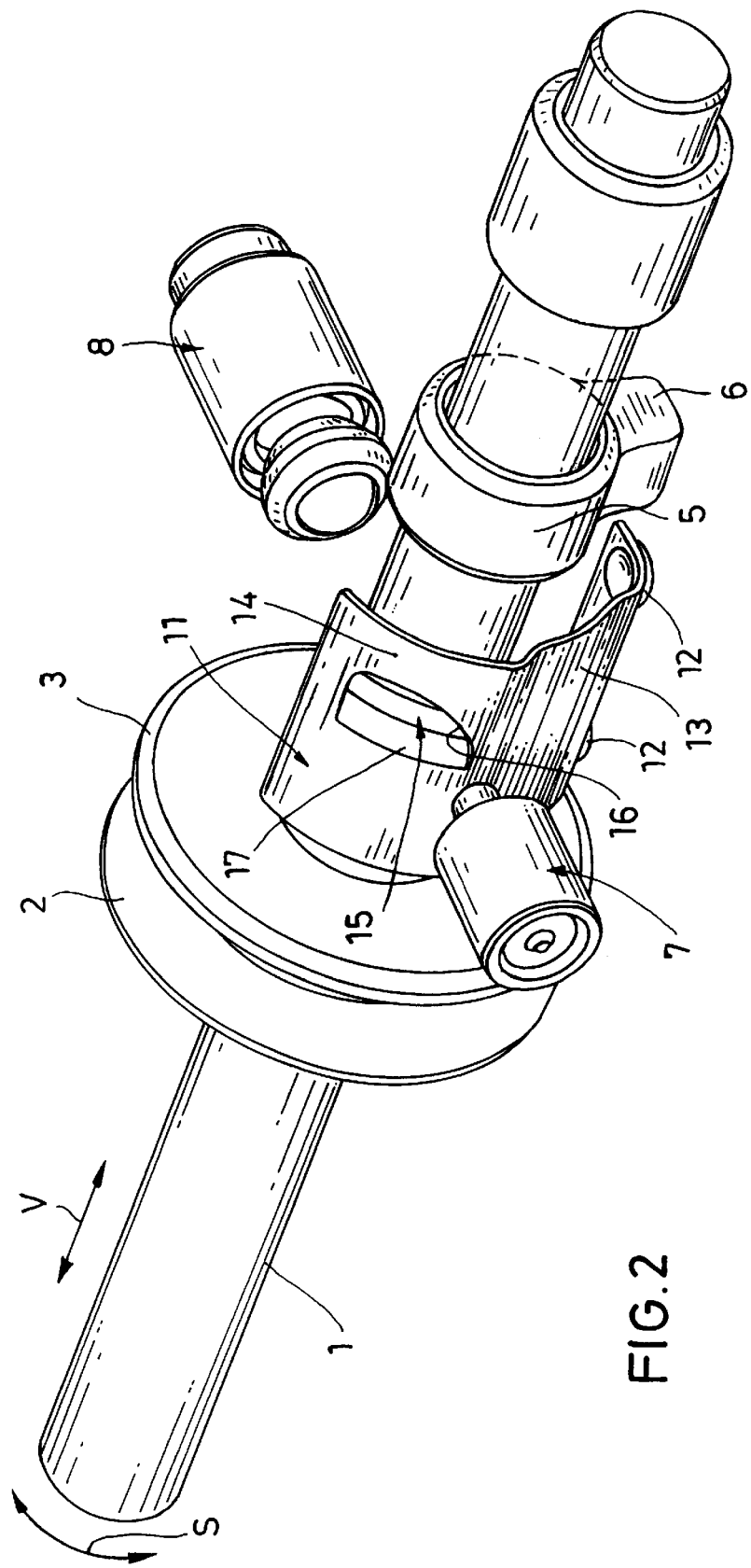
FIG. 2 shows a perspective view similar to FIG. 1, but with the cylindrical guide member omitted so as better to show the shift block.

In FIG. 1 and FIG. 2 only part of a gearshift device for a motor vehicle manual transmission is shown, wherein a shift shaft 1, which is axially displaced for preselection of shift lanes and angularly rotated for engagement of gears, is provided with a mounting flange 2, by means of which it can be inserted in an opening in a transmission housing (not shown).

Connected non-rotatably to the shift shaft 1 there is also a disc 3, to which a cylindrical guide member 4 of sheet material is fixed so as to make movements corresponding to those of the shift shaft, in the direction of the arrow V for preselection of shift lanes and in the direction of the arrow S to engage the gears.

A shift finger 6, fitted non-rotatably to the shift shaft 1 through a shift finger hub 5, cooperates in the usual way (not shown) with corresponding grooves in shift arms of shift forks of the manual transmission in order to perform corresponding gearshifts. Cooperating with the cylindrical sheet material guide member 4 are on the one side a stationary, rotatably mounted shift pin 7 and on the other side a stationary, spring-loaded ball catch 8, which are fitted in the transmission housing in a manner not shown in more detail.

A shift gate 9, known per se, in the form of an extended H is formed in the cylindrical guide member 4 by stamped slits. Also formed on the cylindrical guide member are latching troughs 10 extending parallel to the axis of the cylinder, of which the middle one, in cooperation with the spring-loaded ball catch 8, defines the neutral position of the shift shaft, while the two latching troughs on either side of the neutral position trough define engagement positions of the shift shaft, the shape of the latching troughs serving, in cooperation with the spring-loaded ball catch 8, to assist in the engagement of the respective gear.

Figure 3:
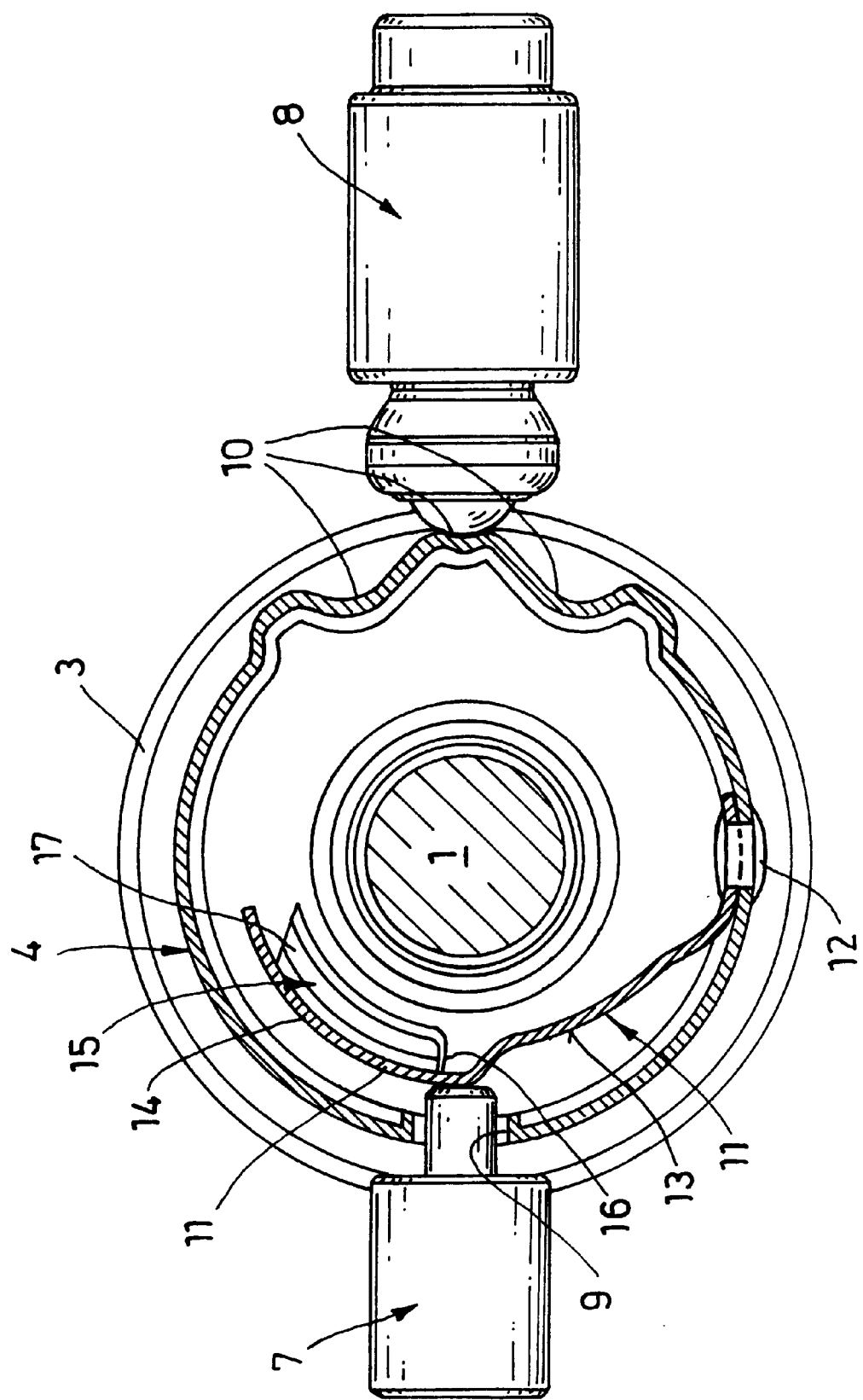
FIG. 3 is a section along the line III—III in the case of a shift from the neutral lane towards the fifth gear.
Figure 4:
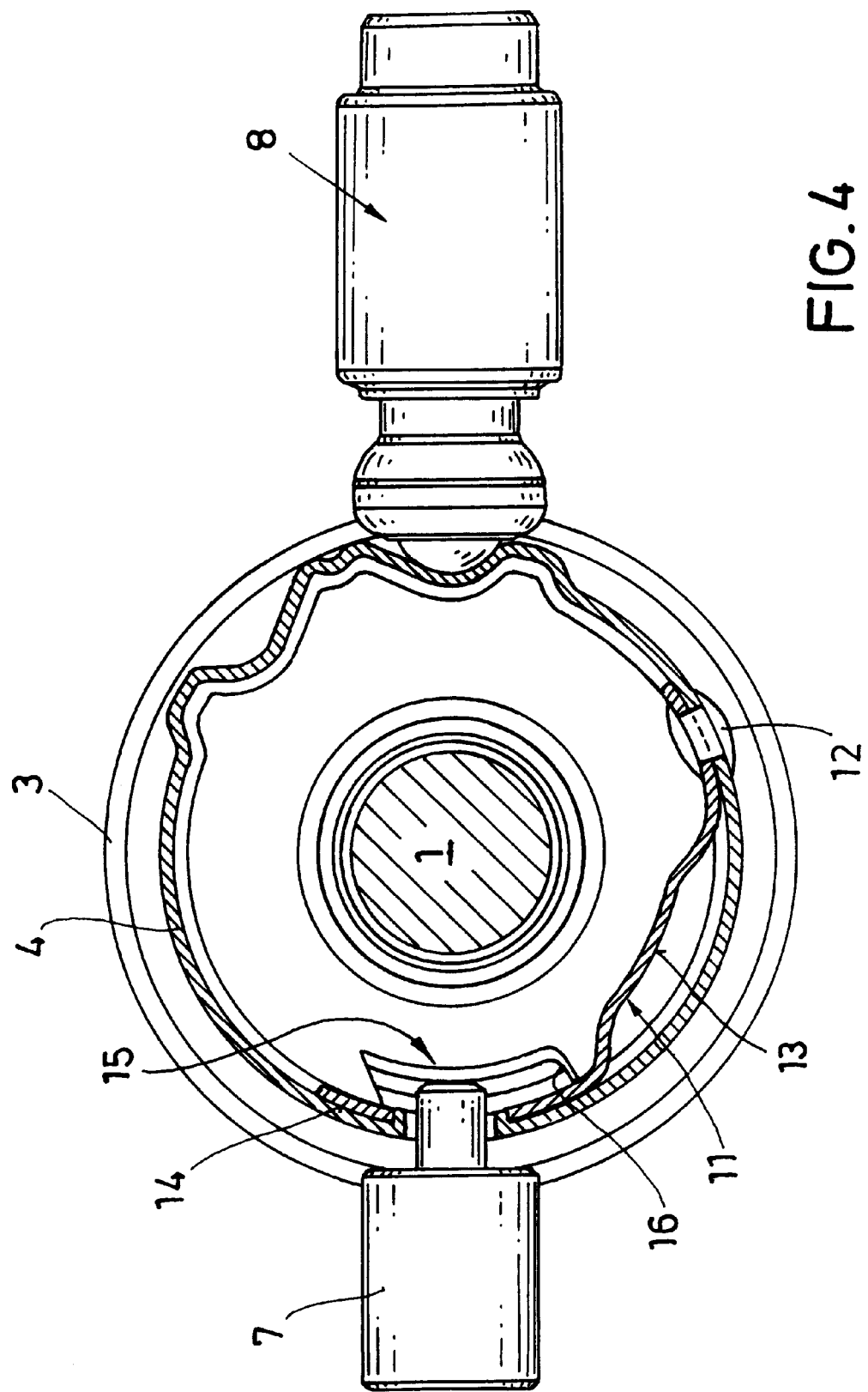
FIG. 4 is a section similar to that of FIG. 3 with the fifth gear engaged.

As can best be seen from FIGS. 2, 3 and 4, a part-cylindrical spring segment 11 is fitted inside the cylindrical guide member 4 and is fixed to the member 4 by rivets 12. The part-cylindrical spring segment 11 has an external contour, which cooperates with the shift pin 7 in the following manner:

When viewed in the axial direction (see FIG. 4) the part-cylindrical spring segment 11 has a first circumferential section 13, which is spaced from the internal circumference of the cylindrical member 4, and a second circumferential section 14, which is in contact with the internal circumference of the member 4. In a radial shifting movement, the shift pin 7 can normally press the part-cylindrical spring element 11 resiliently away radially inwardly from the member 4.

However, in the vicinity of the fifth and reverse gear shift lane, the part-cylindrical spring element 11 exhibits a ramp-like depression 15, so that if a cross-shifting movement from fourth to fifth gear is made, first of all the circumferential region 14 of the spring segment 11 can be pressed away, but on reaching the fifth gear the spring segment 11 springs back again outwardly. In a subsequent shifting movement from the fifth gear towards the reverse gear, a through shift in this shift lane is not possible, since the shift pin 7 is then caught on the steep edge 16 of the ramp-like depression 15. However, a ramp 17 pointing to the left to the fourth gear permits movement in the direction of the fourth gear, since this ramp 17 makes a resilient inward movement of the spring segment 11 possible.

In this way a reliable reverse gear shift block is made available by simple, economical means when the reverse gear is located in the fifth gear shift lane.

What is claimed is:

1. A gearshift device for a motor vehicle manual transmission, comprising:

a shift shaft mounted for displacement along an axis and angular rotation about the axis;

a guide member fixed to the shift shaft, having a substantially cylindrical shift gate comprising a system of interconnected slits defining various gear ratio positions, and troughs extending parallel to the axis;

a stationary shift pin extending into the system of slits for guiding movement of the shift shaft;

a stationary spring-loaded ball catch adapted to latch with the troughs; and a part-cylindrical spring segment located within and fixed to the guide member, elastically contacting the shift pin, having a depression adapted for engagement by the shift pin to prevent predetermined movement of the shift shaft.

2. The gearshift device of claim 1, wherein the depression includes a sharp edge located at an edge of the depression adjacent a reverse gear ratio position and a ramp rising from the depression in the direction of a fourth gear ratio position.

3. The gearshift device of claim 1, further comprising a shift finger fixed to the shift shaft for producing gear ratio changes in the transmission corresponding to movement of the shift shaft.

4. The gearshift device of claim 1, wherein contact of the spring-loaded ball catch on the surface of the troughs urges and assists movement of the shift shaft to the gear ratio positions.

* * * * *